(12) United States Patent  (10) Patent No.: US 8,347,051 B2
Wada  (45) Date of Patent: Jan. 1, 2013

(54) STORAGE APPARATUS, BACKUP APPARATUS, AND BACKUP METHOD

(75) Inventor: Mihoko Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 12/638,466

(22) Filed: Dec. 15, 2009

(65) Prior Publication Data

US 2010/0169596 A1 Jul. 1, 2010

(30) Foreign Application Priority Data

Dec. 29, 2008 (JP) ................................ 2008-335632

(51) Int. Cl.
*G06F 12/16* (2006.01)
*G06F 11/16* (2006.01)
(52) U.S. Cl. .......................................... 711/162; 714/6.3
(58) Field of Classification Search .................... None
See application file for complete search history.

(56) References Cited

U.S. PATENT DOCUMENTS

| 7,370,235 | B1  |   | 5/2008 | Gulve et al. |         |
|-----------|-----|---|--------|--------------|---------|
| 7,747,576 | B2  | * | 6/2010 | Micka .......... | 707/646 |
| 2006/0101217 | A1 |   | 5/2006 | Maki et al. |         |
| 2006/0236050 | A1 | * | 10/2006 | Sugimoto et al. ............. | 711/162 |
| 2006/0248381 | A1 |   | 11/2006 | Fujita et al. |         |
| 2007/0220223 | A1 | * | 9/2007 | Boyd et al. ................ | 711/162 |
| 2008/0177964 | A1 | * | 7/2008 | Takahashi et al. ............ | 711/162 |
| 2008/0275926 | A1 | * | 11/2008 | Kitamura et al. ............. | 707/204 |

FOREIGN PATENT DOCUMENTS

| JP | 2001-344137 | 12/2001 |
|----|-------------|---------|
| JP | 2006-139477 | 6/2006  |
| JP | 2006-309506 | 11/2006 |
| JP | 2008-181288 | 8/2008  |

\* cited by examiner

*Primary Examiner* — Gary Portka

(74) *Attorney, Agent, or Firm* — Staas & Halsey LLP

(57) ABSTRACT

A storage apparatus includes a second volume which stores data serving as a copying source of data to be stored in a first volume, serving as a data copying destination in another storage apparatus, a session establishing unit which establishes a session between the second volume and the first volume, and a copy directing unit which directs a volume, including a free area, in the other storage apparatus such that data equivalent to the data to be stored in the first volume is copied, in response to a copy setting command issued by a server.

15 Claims, 10 Drawing Sheets

US 8,347,051 B2

STORAGE APPARATUS, BACKUP APPARATUS, AND BACKUP METHOD

CROSS-REFERENCE TO RELATED APPLICATIONS

This application is based upon and claims the benefit of priority of the prior Japanese Patent Application No. 2008-335632, filed on Dec. 29, 2008, the entire contents of which are incorporated herein by reference.

FIELD

The embodiments described herein relate to a storage apparatus, a backup apparatus, and a backup method.

BACKGROUND

Typically, storage apparatuses, which include remote advanced copy functions for the purpose of protecting data from a failure (such as, accidents or the like) and quickly recovering the failure, have a "remote equivalent copy (REC)" function.

The REC is a copying function between storage apparatuses installed on remote sites. With the REC function, a volume may be copied (that is, replication) without a business server interposed between the remote storage apparatuses.

Typically, when a backup site is used as storage for data backup purpose, a server is not installed in the backup site.

However, if the backup site is used such that settings associated with local copying a piece of data, which is received from a main site, are made at the backup site, it is necessary to install a server separately in the backup site and a copy setting command is issued thereto.

However, installing the server only for the purpose of the settings associated with local copying the data will cause a problem in that operating costs increases.

The present invention is made in consideration of the problem discussed above and others existing with respect to typical storage systems. An object of the present invention is to provide a storage apparatus, a backup apparatus, a backup method, and a backup system capable of achieving local copying without installing a server in a backup site.

Moreover, another object of the present invention is to provide a storage apparatus, a backup apparatus, a backup method, and a backup system capable of re-creating a remote backup environment by copying only a necessary area even in a case where a failure has occurred in a disk during a remote backup process.

SUMMARY

According to an aspect of an embodiment, a storage apparatus includes a second volume which stores data serving as a copying source of data to be stored in a first volume, serving as a data copying destination in another storage apparatus, a session establishing unit which establishes a session between the second volume and the first volume, and a copy directing unit which directs a volume, including a free area, in the other storage apparatus such that data equivalent to the data to be stored in the first volume is copied, in response to a copy setting command issued by a server.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
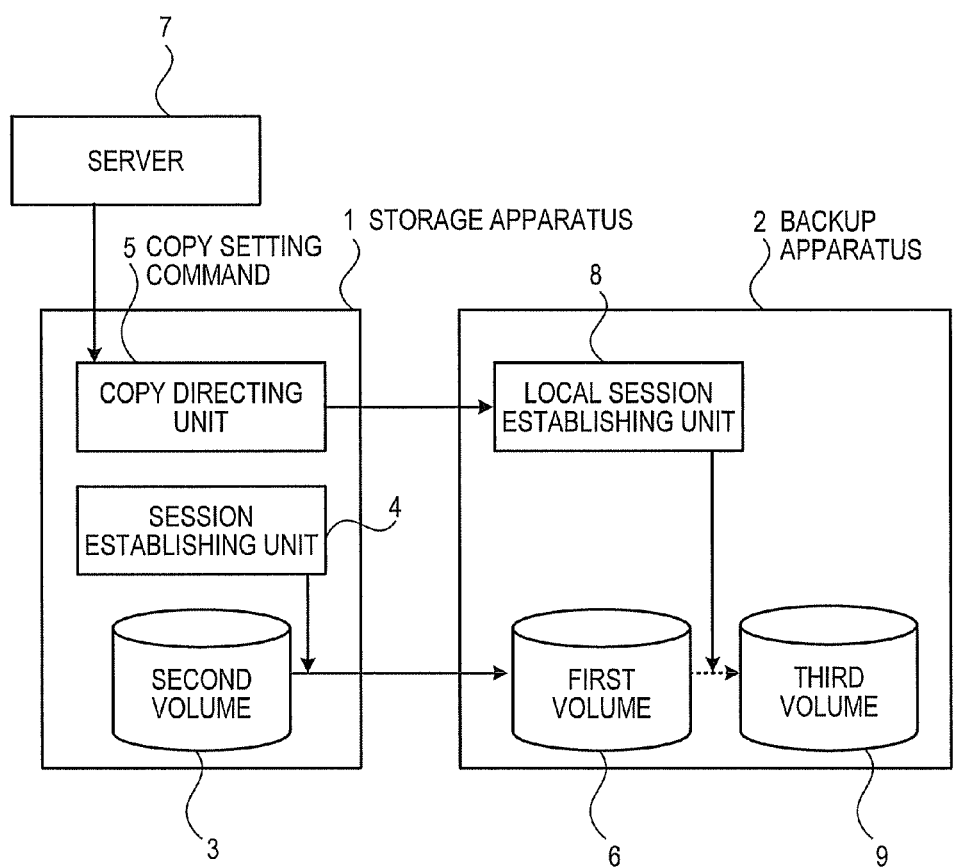
FIG. 1 illustrates an outline of a storage apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, an embodiment will be disclosed in detail with reference to drawings. First, an outline of a system for achieving an embodiment is disclosed, and then the embodiment will be disclosed further in detail.

FIG. 1 illustrates an outline of a storage apparatus according to an embodiment.

A storage apparatus 1 copies data to a backup apparatus 2 with use of a remote equivalent copy (REC) function.

The storage apparatus 1 includes a second volume 3, a session establishing unit 4, and a copy directing unit 5.

Data is stored in the second volume 3. This data serves as a copying source of data to be stored in a first volume 6 serving as a copying destination. Note that the first volume is provided in the backup apparatus 2.

The session establishing unit 4 establishes a session between the second volume 3 and the first volume 6.

Establishing the session allows the data stored in the second volume 3 to be copied to the first volume 6.

Hereinafter, equivalent copying of data between different apparatuses in a cascade manner may be referred to as a "REC."

The copy directing unit 5 directs a third volume 9, for example, having a free area, in the backup apparatus 2 to create an equivalent copy of data (a local-copy) that is equivalent to the data stored in the first volume 6, within a certain housing, in response to a copy setting command issued by a server 7. Hereinafter, equivalent local copying of data may be referred to as an "EC."

A local session establishing unit 8 provided in the backup apparatus 2 receives an equivalent copy instruction, so that a local session is established between the first volume 6 and the third volume 9 having the free space.

Establishing the local session allows the data stored in the first volume 6 to be copied to the third volume 9.

According to the storage apparatus 1 disclosed above, the local session is capable of being established without the need of the interposition of any server on the backup apparatus 2 side.

Hereinafter, the embodiment is disclosed in further detail.

Figure 2:
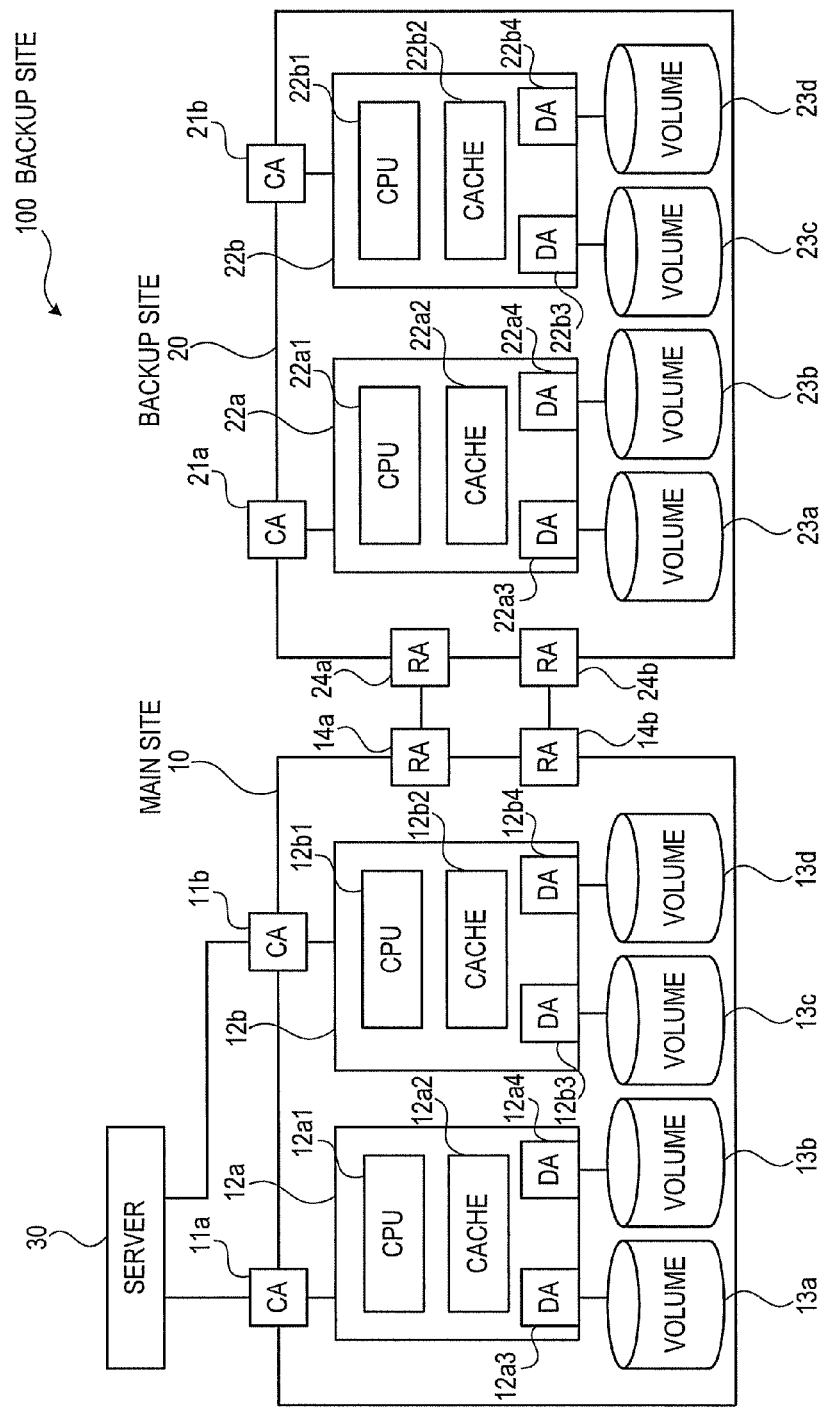
FIG. 2 illustrates an example of a hardware configuration of a backup system.

FIG. 2 illustrates an example of a hardware configuration of a backup system.

A backup system (site) 100 illustrated in FIG. 2 includes a main site (storage apparatus) 10, a backup site (backup apparatus) 20, and a server (business server) 30.

The server 30 communicates with the main site 10 and controls the main site 10 and the backup site 20. More specifically, the server 30 allows the main site 10 and the backup site 20 to share data by using a remote advanced copy function. In addition, the server 30 makes settings associated with local copying the data in the backup site 20 (details thereof will be disclosed below).

The main site 10 includes channel adapters (CA) 11a and 11b, centralized modules (CM) 12a and 12b, volumes 13a through 13d, and remote adapters (RA) 14a and 14b.

Each of the channel adapters 11a and 11b controls an interface between the centralized module 12a and the server 30 and between the centralized module 12b and the server 30.

The entire centralized module 12a is controlled by a central processing unit (CPU) 12a1. The CPU 12a1 is coupled to a cache 12a2 and device adapters (DA) 12a3 and 12a4.

The cache 12a2 temporarily stores at least a part of operating system (OS) programs and/or application programs executed by the CPU 12a1. In addition, the cache 12a2 stores a variety of data, such as, bitmaps that are necessary for the CPU 12a1 to execute its processing.

The device adapters 12a3 and 12a4 are each coupled to the corresponding volumes 13a and 13b. The device adapters 12a3 and 12a4 each send/receive data from/to the volume 13a and 13b.

Note that the centralized module 12b has the same or similar structure to that of the centralized module 12a.

The remote adapters 14a and 14b each include, for example, a fibre channel switch or the like. The remote adapters 14a and 14b allow the backup site 20 to send/receive data between apparatuses even if the backup site 20 is placed in a site(s) separated from the main site 10 (remote site).

Figure 3:
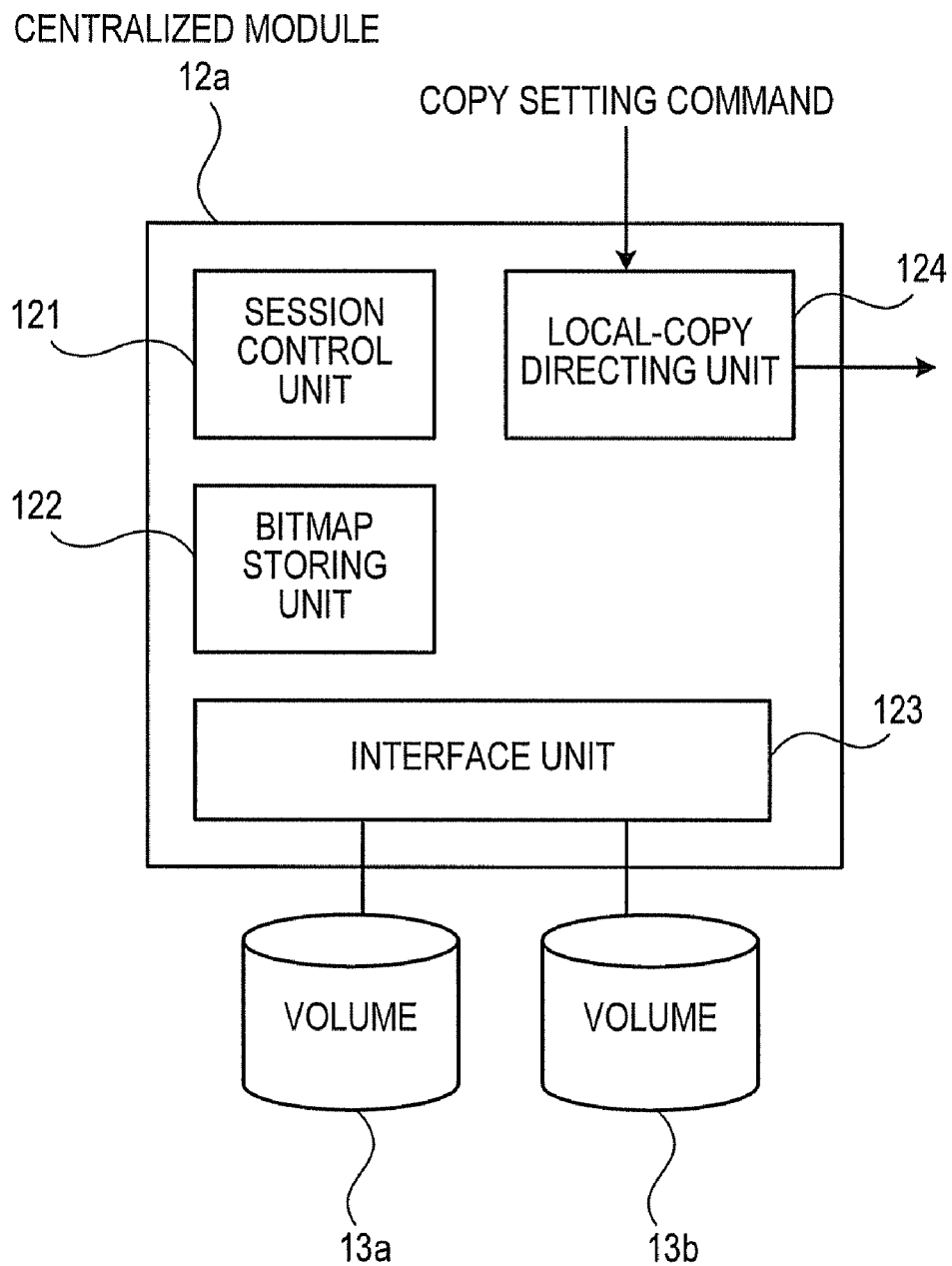
FIG. 3 illustrates function(s) of a main site.

The hardware configuration of the main site 10 is disclosed in the above description. As illustrated in FIG. 3, the backup site 20 may also be achieved with the same or similar hardware configuration to that as disclosed in the above description. Note, however, that the server 30 is not directly connected to the channel adapters 21a and 21b in the backup site 20. The backup site 20 receives instructions from the server 30 via the remote adapters 21a and 21b.

The hardware configuration as disclosed above allows achieving processing function(s) according to an embodiment. To securely back up the data in the backup system 100 having the above-disclosed hardware configuration, the main site 10 and the backup site 20 are provided with the functions as disclosed below in detail.

FIG. 3 illustrates units and corresponding functions of the main site. The centralized module 12a includes a session control unit 121, a bitmap storing unit 122, an interface unit 123, and a local-copy directing unit 124.

The session control unit 121 includes a function achieved by the CPU 121a. The session control unit 121 controls sessions (note that a "session" is a series of processes in copying the data) with the volumes 23a through 23d in the backup site 20 in copying the data. Note that the processing executed by the session control unit 121 will be disclosed below in detail in the description associated with first recovery processing and second recovery processing.

The bitmap storing unit 122 includes a function achieved by the cache 12a2. The bitmap string unit 122 stores bitmaps which distinguish a copied area (an area whose data copying has been completed) and an uncopied area (an area whose data copying has not been performed), based on bits in copying the data to the backup site 20. On the bitmap, the copied area is represented by bit "0" and the uncopied area is represented by bit "1."

The interface unit 123 may be an interface between the centralized module 12a and the volumes 13a and 13b.

The local-copy directing unit 124 receives a copy setting command(s) from the server 30 and directs the backup site 20 to perform local copying, in response to the contents of the copy setting command.

Note that the centralized module 12b is provided with a function which is the same as or similar to the function of the centralized module 12a.

Figure 4:
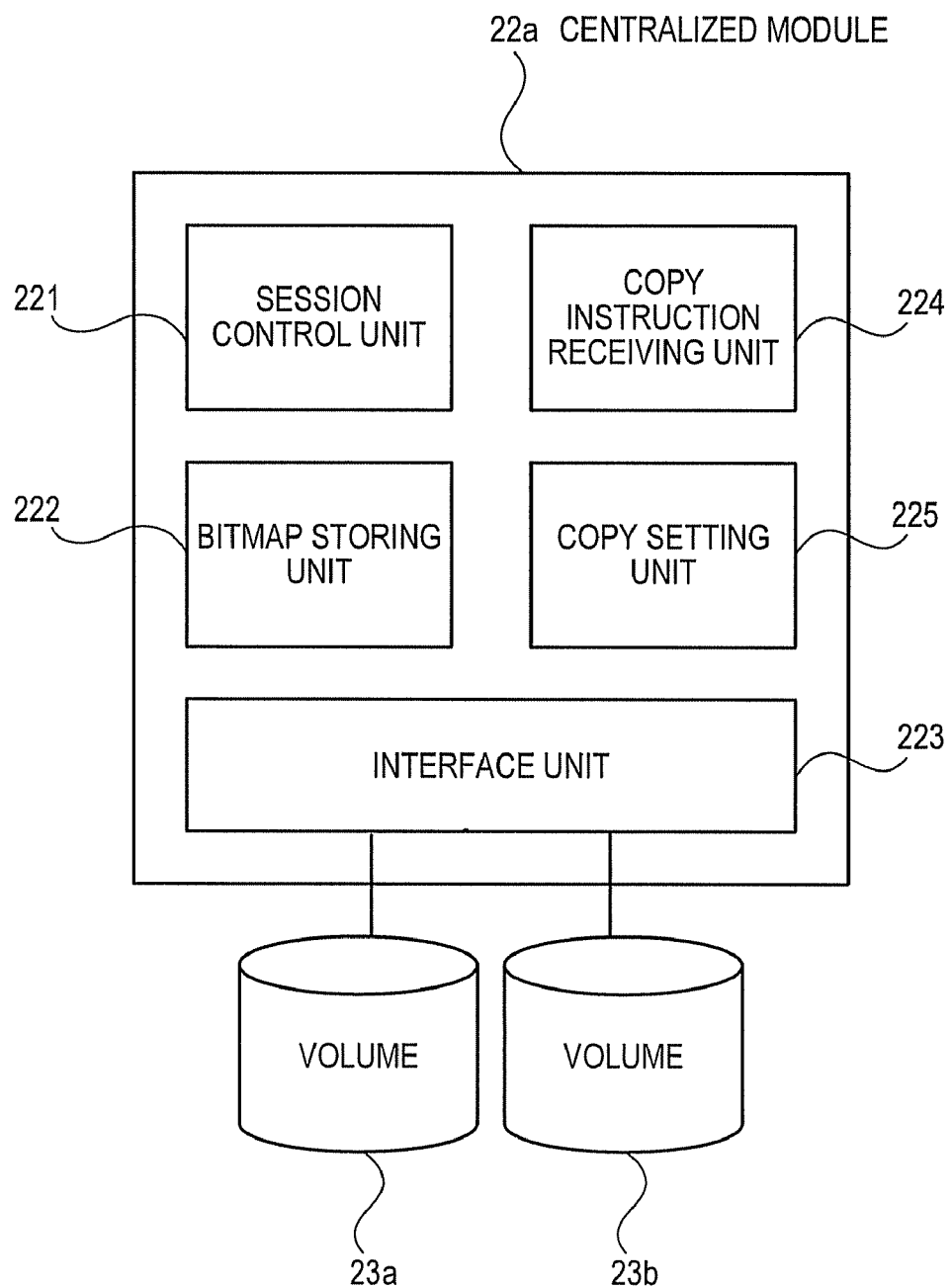
FIG. 4 illustrates function(s) of a backup site.

FIG. 4 illustrates a block diagram indicating units and corresponding functions of the backup site.

A centralized module 22a includes a session control unit 221, a bitmap storing unit 222, and an interface unit 223. In addition thereto, the centralized module 22a further includes a copy instruction receiving unit 224 and a copy setting unit 225. Note that the session control unit 221, the bitmap storing unit 222, and the interface unit 223 are each provided with functions which are the same as or similar to those of the session control unit 121, the bitmap storing unit 122, and the interface unit 123.

The copy instruction receiving unit 224 receives a local-copy instruction, from the main site 10.

Based on the local-copy instruction received by the copy instruction receiving unit 224, settings associated with local copying of the volume 23a (23b) (local copying source), which stores data equivalent to the data stored in the volume 13a or in the volume 13b, into the volume 23b (23a) (local copying destination) is made by the copy setting unit 225.

Note that the main site 10 may include functions which are the same as or similar to those of the copy instruction receiving unit 224 and the copy setting unit 225. In addition, the backup site 20 may include a function that is the same as or similar to that of the local-copy directing unit 124.

Note that a centralized module 22b also includes a function that is the same as or similar to that of the centralized module 22a.

Next, a local-copy setting operation of the backup system will be disclosed.

Figure 5:
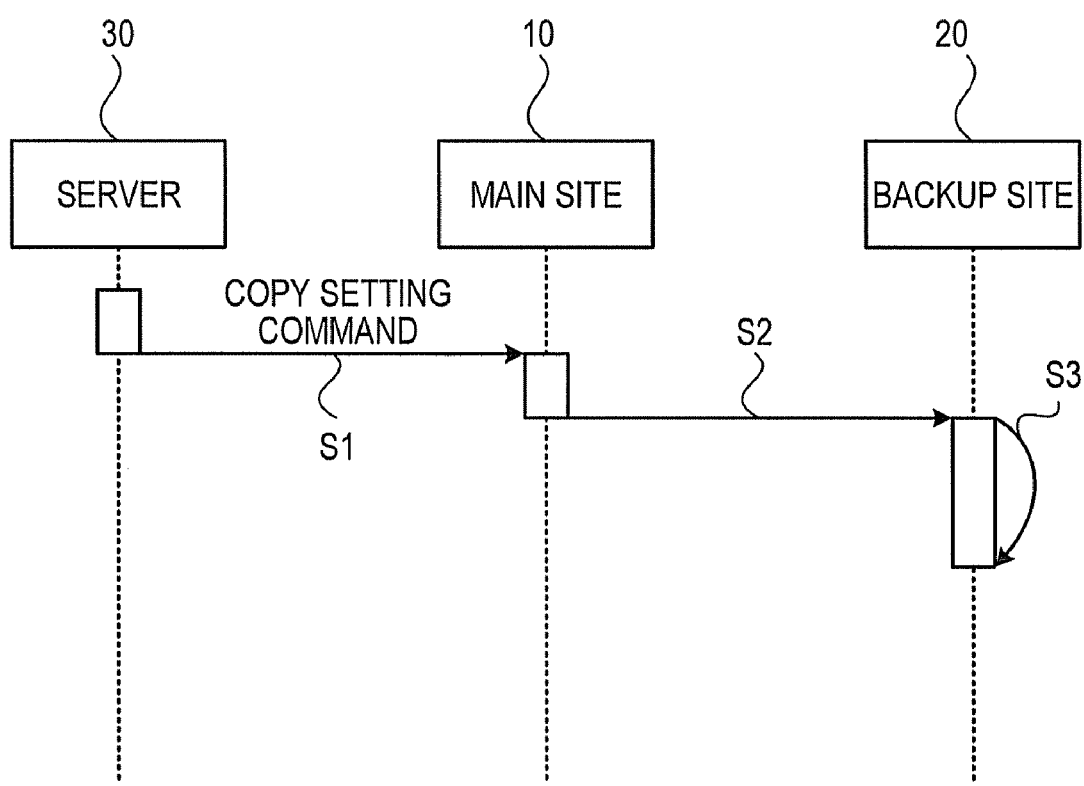
FIG. 5 illustrates a local-copy setting operation in a backup system.

FIG. 5 illustrates a diagram indicating a local-copy setting operation of a backup system.

First, the copy setting command is issued to the backup site 20 from the server 30 (Operation S1). The copy setting command includes volume identification information, address information associated with the area which is to be copied, and so on. While particular examples are used as being included in the copy setting command, the present invention is not limited thereto.

Next, the main site 10 sends the local-copy instruction to the backup site 20 (Operation S2).

Then, the copy setting unit 225, having received the local-copy instruction from the copy instruction receiving unit 224, makes the settings associated with the local copying, based on the received instruction (Operation S3). More specifically, a certain volume for which the settings associated with the local copying is made is specified, based on the volume identification information included in the above instruction, and the settings associated therewith is made so that data writing is started from an address, which is specified by the above instruction, in the certain volume.

As disclosed hereinbefore, issuing the copy setting command from the server 30 makes it possible to achieve the settings associated with the local copying for the backup site 20 even if the server 30 is not directly connected to the backup site 20.

Then, a recovery processing when a failure has occurred in the volume, serving as the local copying source, in the backup site 20 is disclosed.

Figure 6:
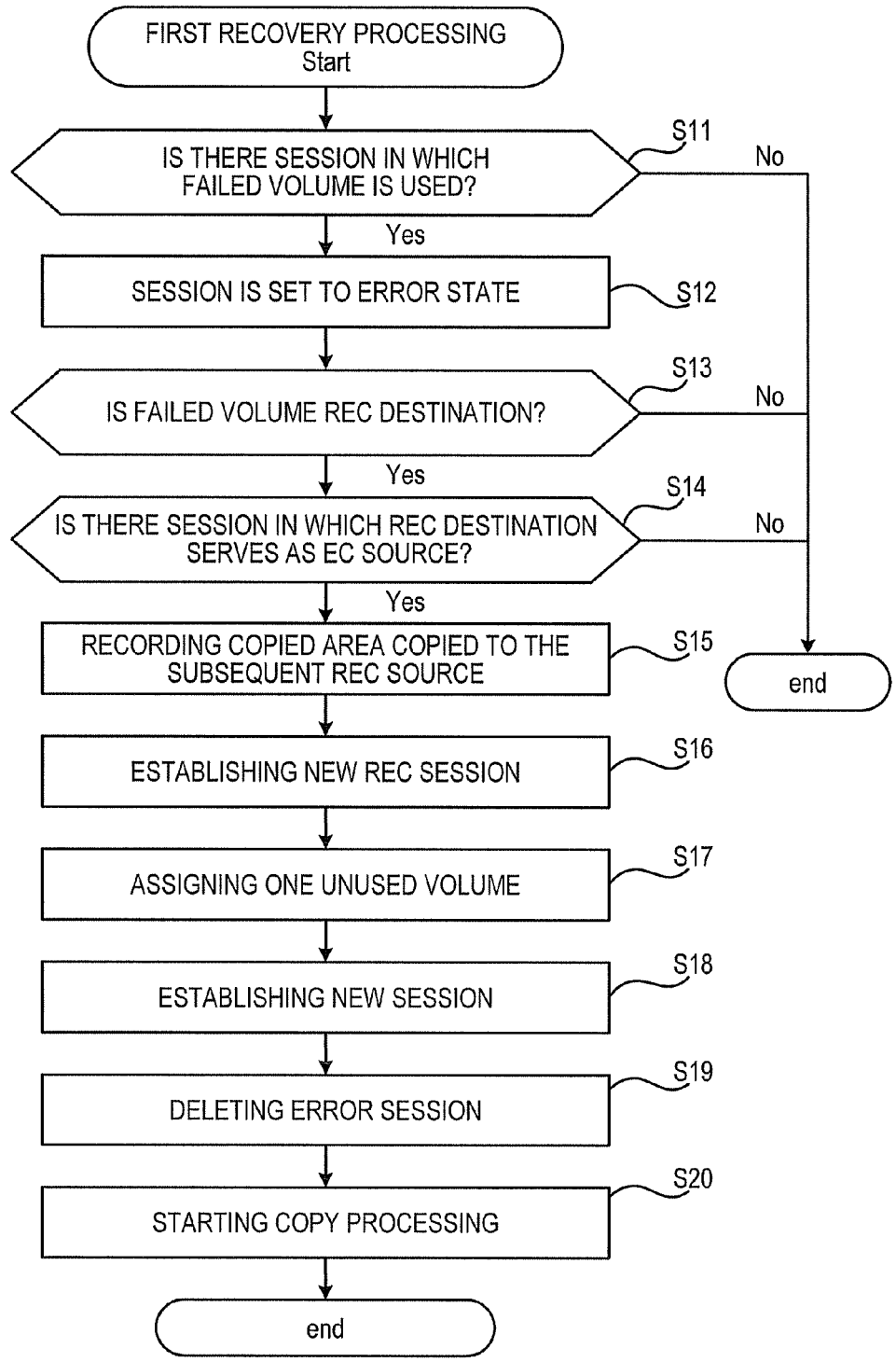
FIG. 6 illustrates a flowchart indicating a first recovery processing.

FIG. 6 illustrates a flowchart indicating a first recovery processing.

First, the session control unit 121 determines whether or not there is a session in which a failed volume is used (Operation S11).

If there is no session in which the failed volume is used (No in Operation S11), the first recovery processing terminates.

On the other hand, if there is a session in which the failed volume is used (Yes in Operation S11), the session is placed in an error state by the session control unit 121 (Operation S12).

Then, the session control unit 121 determines whether or not the failed volume is a REC destination volume (Operation S13).

If the failed volume is not the REC destination volume (No in Operation S13), the first recovery processing terminates.

On the other hand, if the failed volume is the REC destination volume (Yes in Operation S13), the session control unit 121 determines whether or not there is a session in which the REC destination volume serves as an EC source volume (Operation S14).

If there is no session in which the REC destination volume serves as the EC source volume (No in Operation S14), the first recovery processing terminates.

On the other hand, if there is a session in which the REC destination volume serves as the EC source volume (Yes in Operation S14), the session control unit 121 records a copied area, having already been copied to a subsequent REC source volume, in a bitmap and the bit map is stored in the bitmap storing unit 222 (Operation S15).

Next the session control unit 121 establishes a new REC session between the REC source volume and an EC destination volume (Operation S16). At this point of time, the uncopied areas in the REC source volume and the EC destination volume are merged to obtain an uncopied area in the EC destination volume (for which the REC session has been established), and the bitmap thereof is stored in the bitmap storing unit 222.

Hereinafter, the REC destination volume disclosed in Operations S13 and 514 is referred to as a "former REC destination volume", and the EC destination volume (for which REC session has been established in Operation S16) is referred to as a "new REC destination volume."

Then, one (1) volume that is unused (but usable) in the backup site 20 is assigned (Operation S17).

Then, a new EC session between the new REC destination volume and the volume assigned at Operation S17 is established (Operation S18). At this point of time, a full range of the assigned volume is specified as the uncopied area.

Then, the session placed in the error state in Operation S12, that is to say, the session between the REC source volume and the former REC destination volume, is deleted (Operation S19).

Then, copy processing between the respective volumes is started by using the REC session established in Operation S16 and the EC session established in Operation S18 (Operation S20).

The first recovery processing terminates with Operation S20.

Note that if a failure has occurred in a volume in the main site 10, the following procedures may also be possible, that is, a server is connected to the backup site 20, a command for acquiring information associated with the session established in the backup site 20 is issued, and a volume serving as the copying destination may be identified. The procedures disclosed above makes it possible to identify the volume that holds the backup data.

Next, a detailed example of the first recovery processing will be disclosed.

Figure 7:
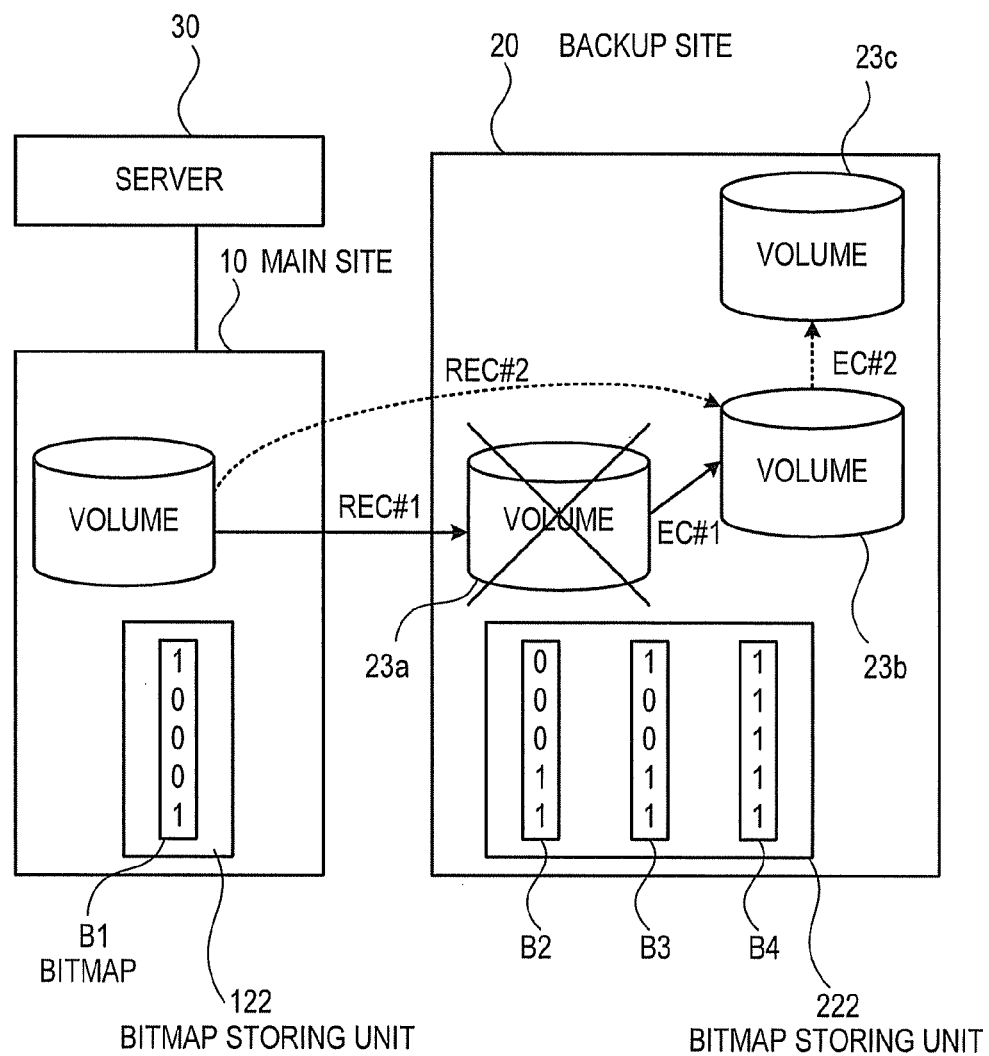
FIG. 7 illustrates a detailed example of a first recovery processing.

FIG. 7 illustrates a detailed example of the first recovery processing. Note that, in FIG. 7, illustration of a part of the structures included in the backup system 100 is omitted to facilitate the description.

In the detailed example, a session REC#1 between the volume 13*c* in the main site 10 and the volume 23*a* in the backup site 20 has already been established. A session EC#1 between the volume 23*a* and the volume 23*b* has already been established. Note that the description below is made based on the assumption that a failure has occurred in the volume 23*a* and the session REC#1 and the session EC#1 are placed in an error state.

A copied area, which has already been copied to the volume 23*a*, serving as a copying source, during the session REC#1 placed in the error state, is recorded in a bitmap B1 to hold a range of the uncopied area that has not been copied.

Next, a session REC#2 between the volume 13*c* and the volume 23*b* (note here that the volume 23*b* is a copying destination) is established.

Then, the uncopied areas during the session REC#1 and the session EC#1 are merged to obtain an uncopied area during the session REC#2. More specifically, a bitmap B3 "100 μl" obtained by merging the bitmap B1 "10001" and a bitmap B2 "00011" (associated with the volume 23*a*) is stored and held, as a copied area in the volume 23*b*, in the bitmap storing unit 222.

Then, an unused volume 23*c* within the backup site 20 is assigned to establish a session EC#2 between the volume 23*b* and the volume 23*c*. A full range of the session is specified as an uncopied area during this session EC#2. More specifically, a bitmap B4 associated with the volume 23*c* is set to "11111."

Then, the session REC#1 and the session EC#1 having been placed in the error state are deleted.

Thereafter, the copy processing is started by using the sessions REC#2 and EC#2 and the bitmaps B1, B3 and B4.

Hereinafter, a second recovery processing will be disclosed.

The second recovery processing is recovery processing used for the case in which data in the volumes is generation-managed within the backup site 20.

Figure 8:
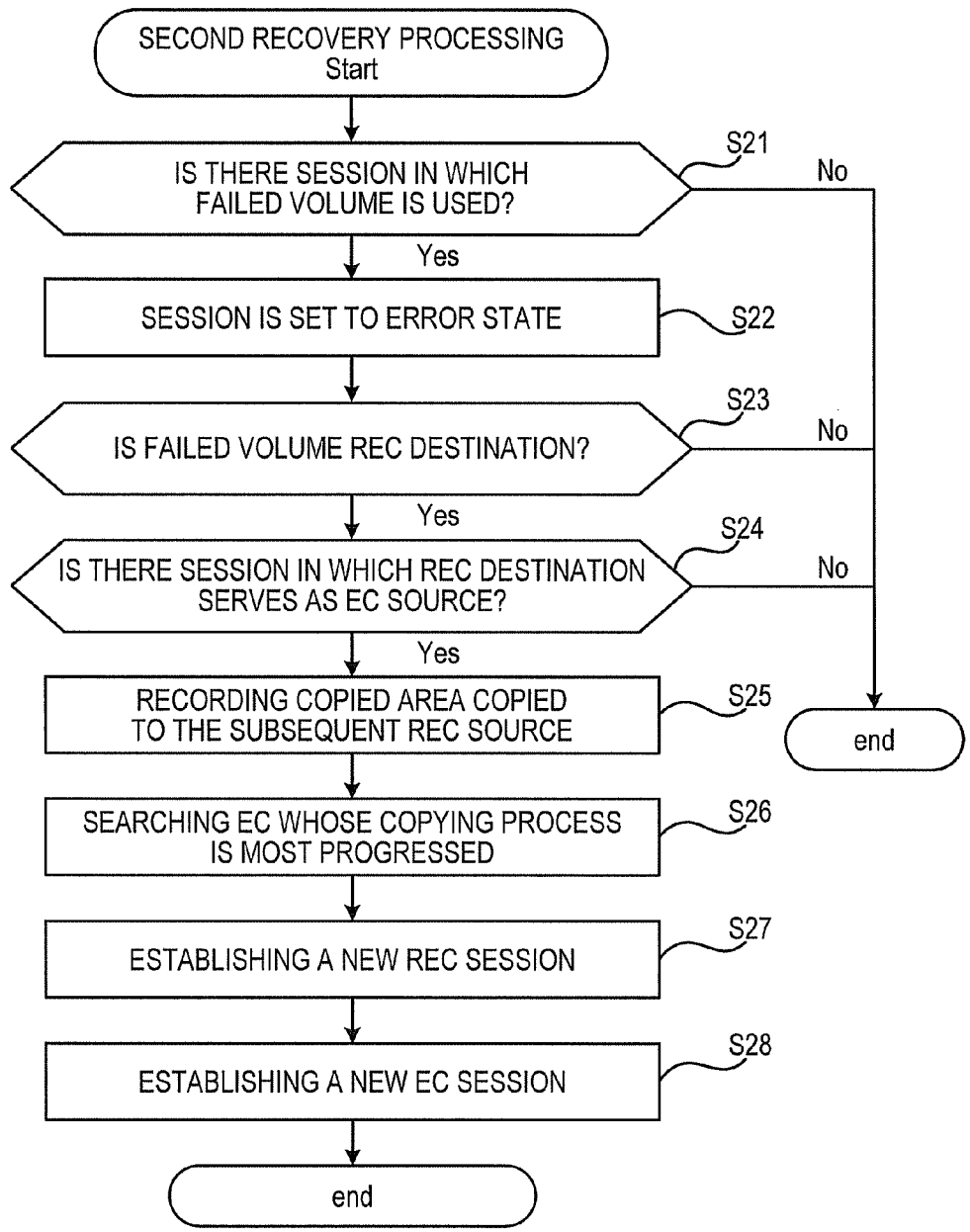
FIG. 8 illustrates a flowchart indicating a second recovery processing.
Figure 9:
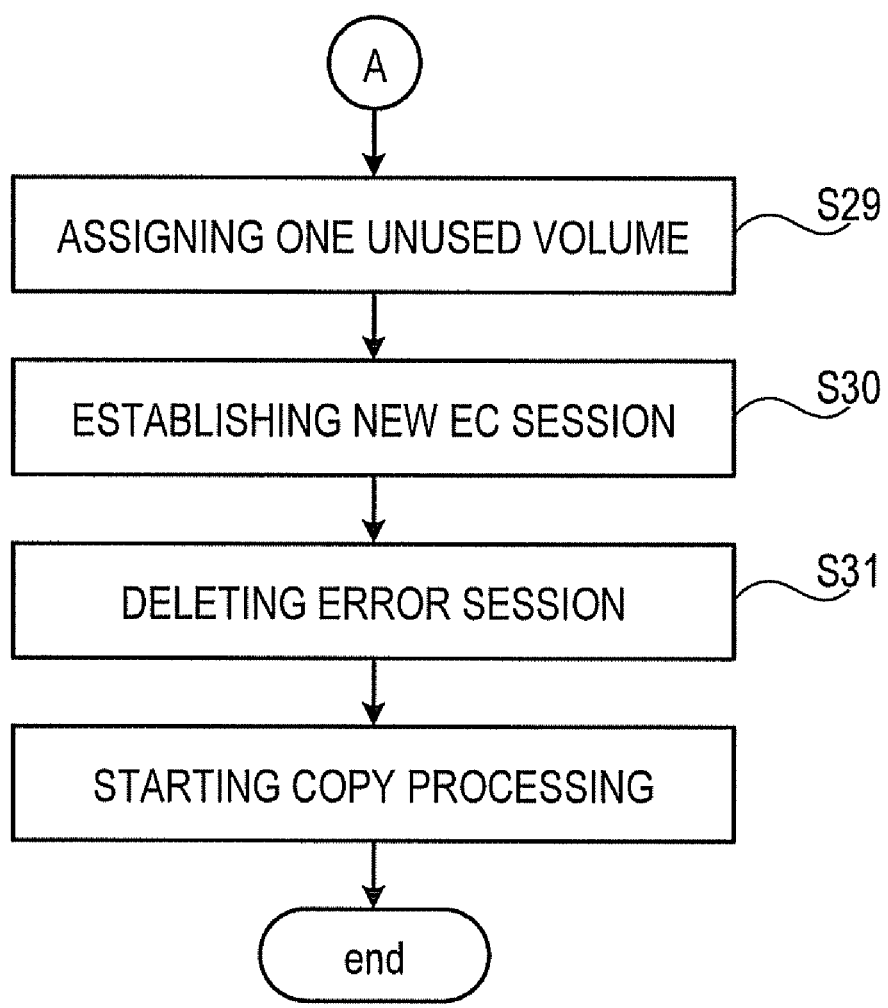
FIG. 9 illustrates a flowchart indicating a second recovery processing.

FIGS. 8 and 9 illustrate flowcharts indicating the second recovery processing.

The processing that is the same as or similar to that in the operations 811 through S15 is performed in Operations S21 through S25.

Next, the session control unit 121 searches for the EC destination volume in which the copying process is most progressed, in the generation-managed volumes, for example, by referencing the bitmaps (Operation S26).

Then, the session control unit 121 establishes a new REC session between the EC destination volume obtained in Operation 826 and the REC source volume (Operation S27). At this point of time, the uncopied areas in the REC source volume and the EC destination volume are merged to obtain an uncopied area in a new REC destination volume, and the bitmap thereof is stored in the bitmap storing unit 222.

Then, a new EC session between the EC destination volume obtained in Operation S26 and another EC destination volume that is generation-managed is established (Operation S28). At this point of time, the uncopied areas of the REC source volume and the EC destination volume are merged to obtain an uncopied area in a new EC destination volume, and the bitmap thereof is stored in the bitmap storing unit 222.

The processing that is the same as or similar to that in Operation 817 is performed in Operation 829.

Next, a new EC session between a new REC destination volume and the volume that has been assigned in Operation S29 is established (Operation S30). At this point of time, a full range of the assigned volume is specified as the uncopied area.

The processing that is the same as or similar to that in Operations 818 and S19 is performed in Operations 831 and S32.

The first recovery processing terminates with Operation S32.

Next, a detailed example of the second recovery processing will be disclosed.

In the detailed example, a REC session between the volume 13c in the main site 10 and the volume 23a in the backup site 20 has already been established. In addition, the data stored in the volume 23a is generation-managed in the volumes 23b and 23c, and a session EC#1 between the volume 23a and the volume 23b has already been established. Moreover, a session EC#2 between the volume 23a and the volume 23c has already been established. The description below is made based on the assumption that a failure occurs in the volume 23a, and the sessions REC#1, EC#1, and EC#2 are placed in an error state.

Figure 10:
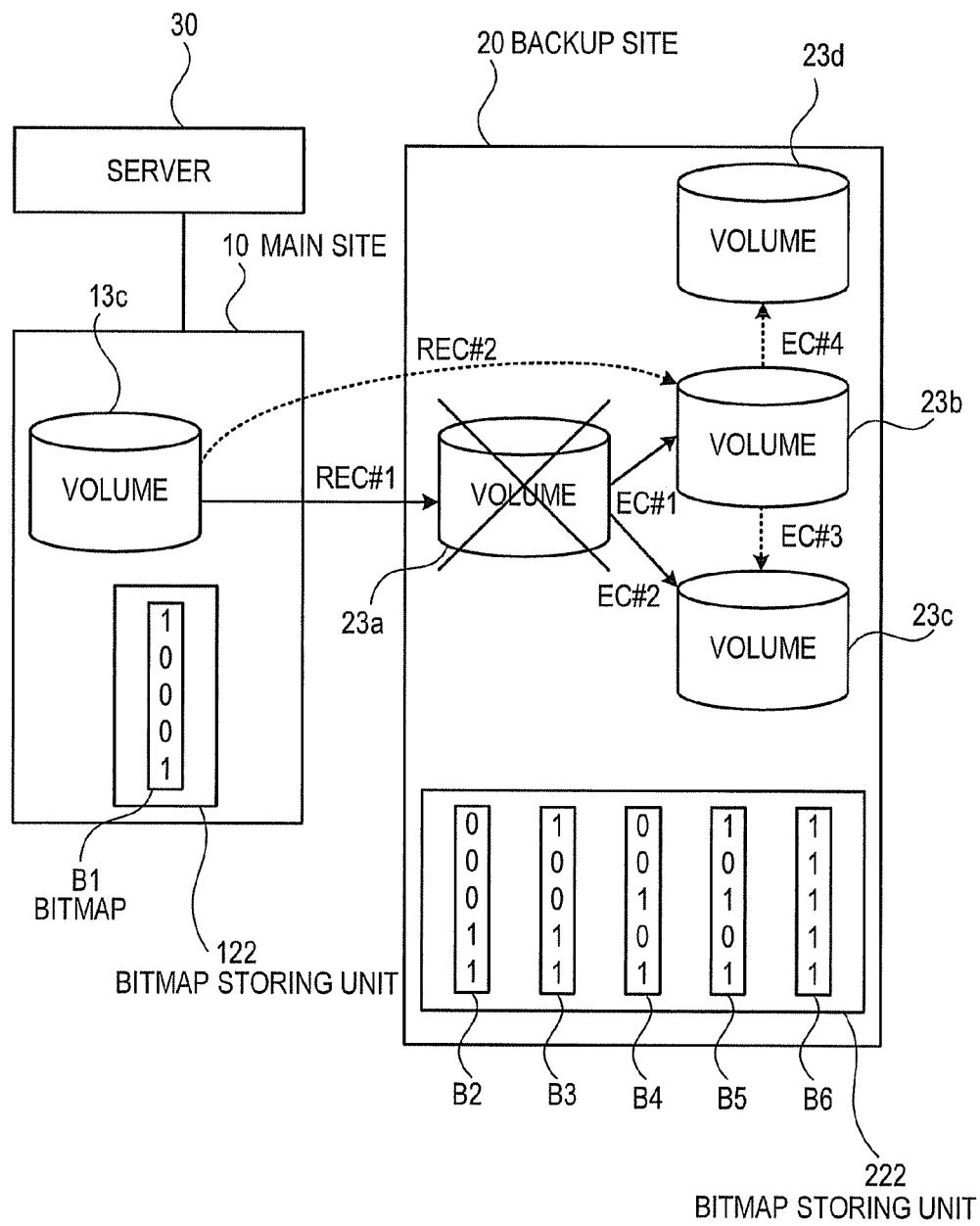
FIG. 10 illustrates a detailed example of a second recovery processing.

FIG. 10 illustrates a detailed example of the second recovery processing.

A copied area, which has already been copied to the volume 23a, serving as a copying source, during the session REC#1 placed in the error state, is recorded in the bitmap B1 to hold a range of the uncopied area that has not been copied.

Next, states of progress of the equivalent copying processes in the volume 23b and the volume 23c are compared, and the volume in which the equivalent copying process becomes more progressed (in this embodiment, the volume 23b) is specified as a copying destination, thereafter, the session REC#2 between the volume 23a and the volume 23b is established.

Then, the uncopied areas during the session REC#1 and the session EC#1 are merged to obtain an uncopied area during the session REC#2. More specifically, the bitmap B3 "10011" obtained by merging the bitmap B1 "10001" associated with the volume 13c and the bitmap B2 "00011" associated with the volume 23b is stored and held, as the uncopied area during the session REC#2, in the bitmap storing unit 222.

Then, a session EC#3 between the volume 23b and the volume 23c is established.

Then, the uncopied areas during the session REC#1 and the session EC#2 are merged to obtain an uncopied area during the session EC#3. More specifically, a bitmap 85 "10101" obtained by merging the bitmap B1 "10001" and bitmap B4 "00101" is stored and held, as the uncopied area during the session EC#3, in the bitmap storing unit 222.

Then, an unused volume 23d within the backup site 20 is assigned, and a session EC#4 between the volume 23b and the volume 23d is established. A full range of the session EC#3 is specified as an uncopied area during the session EC#4. More specifically, a bitmap B6 "11111" is stored and held, as an uncopied area during the session EC#4, in the bitmap storing unit 222.

Next, the session REC#1, the session EC#1, and the session EC#2 having been placed in the error state, are deleted.

Thereafter, the copy processing is started by using the session REC#2, the session EC#3, and the session EC#4.

As disclosed hereinbefore, the backup system 100 is capable of local copying the data without connection between the backup site 20 and the server 30.

In addition, the backup system 100 is capable of reconfiguring an environment, which is equivalent to that before the volume failure, only by copying a necessary area, even if the volume failure has occurred. This capability allows a reduction in communications burden between the sites.

Furthermore, the second recovery processing allows reconfiguration of an environment, which is equivalent to that before the volume failure, only by copying a necessary area, even if data is generation-managed in the backup site 20. This capability also allows the reduction in communications burden between the sites.

More over, if a failure has occurred in the main site 10, a server is connected to the backup site 20, a command acquiring information associated with the session having been established in the backup site 20 is issued, and the copying destination volume is searched, whereby the volume that holds the backup data may be identified.

As disclosed hereinbefore, the storage apparatus, the backup apparatus, the backup method, and the backup system according to the present invention are disclosed based on an embodiment with reference to the drawings. Note, however, that the present invention is not limited thereto and structures of respective parts may be replaced with any structures having the same or similar functions. Moreover, it is possible to add any other structures, processes, and/or operations to the present invention.

In addition, the present invention may be achieved by combining more than one of any of the structures (characteristics) in the embodiment disclosed above.

According to an embodiment, a computer-implemented method is provided that includes issuing a request for a local copying from a storage volume directly communicating with a server and implementing the local copying by establishing a session between the storage volume and a remotely located area that is separate from the storage volume.

Note that the above processing functions may be achieved by a computer. When the computer achieves the above processing functions, a program that includes contents of processing for executing the function of the main site 10 is supplied. Executing the program on the computer makes it possible to perform the above processing functions. The program that includes the contents of processing is capable of being stored in computer-readable recording media. As examples of the computer readable recording media, there may be mentioned, for example, a magnetic recording medium, an optical disk, a magneto-optical recording medium, a semiconductor memory, and so on. As the magnetic recording media, there may be mentioned, for example, a hard-disk drive (HDD), a flexible disk (FD), a magnetic tape, and so on. As the optical disks, there may be mentioned, for example, a digital versatile disc (DVD), a digital versatile disc-random access memory (DVD-RAM), a compact disk-read only memory (CD-ROM), a compact disk-recordable/rewritable (CD-R/RW), and so on. As the magneto-optical disks, there may be mentioned, for example, a magnet-optical disk (MO), and so on.

To distribute the program, for example, it is possible to sell portable-type recording media, capable of storing the program, such as, the DVD, the CD-ROM, and so on. It is also possible to store the program in storage of a server computer, so that the program may be transferred to the other computers from the server computer via a network.

The computer that executes the data backup program stores, for example, the program recorded in the portable-type recording medium or the program transferred from the server computer, in its storage. Then, the computer reads the program from its storage and executes the processing according to the program. Note that it is also possible that the computer directly reads the program from the portable-type recording medium and executes the processing according to the program. In addition, the computer may sequentially execute the processing according to the received program each time the program is transferred from the server computer.

As mentioned above, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A storage apparatus including a remote data copy function, the storage apparatus comprising:
   a second volume which stores data serving as a copying source of data to be stored in a first volume serving as a data copying destination in another storage apparatus;
   a session establishing unit which establishes a session between the second volume and the first volume;
   a copy directing unit which directs a volume, including a free area, in the other storage apparatus such that data equivalent to the data to be stored in the first volume is copied, in response to a copy setting command issued by a server;
   a recording unit which records a data copy completion area in which a data copy from the second volume to the first volume is completed;
   a detection unit which detects a data copy completion area in a third volume serving as a local copying destination for the first volume based on the data copy completion area recorded in the recording unit and a data copy completion area in the first volume when determining a failure has occurred in the first volume; and
   a session terminating unit which terminates the session between the second volume and the first volume when determining the failure has occurred in the first volume, and
   wherein the session establishing unit establishes a session between the third volume and the second volume when determining the failure has occurred in the first volume.

2. The storage apparatus according to claim 1, wherein the detection unit detects only an area in which the data copy completion area recorded in the recording unit and the data copy completion area in the first volume coincide with each other, as the data copy completion area in the third volume.

3. The storage apparatus according to claim 1, wherein the other storage apparatus controls the data copy completion area in the first volume.

4. The storage apparatus according to claim 1, wherein the other storage apparatus further comprises:
   a volume assigning unit which assigns the volume including the free area as a fourth volume; and
   a local session establishing unit which establishes a session between the third volume and the fourth volume.

5. The storage apparatus according to claim 1, wherein when the plurality of third volumes is set, the session establishing unit establishes a session between the third volume in which a copying process is most progressed and the second volume.

6. The storage apparatus according to claim 4, wherein the local session establishing unit establishes a session between the third volume whose session has been established by the session establishing unit and one of the third volumes except the third volume whose session has been established by the session establishing unit.

7. A backup apparatus including a remote data copy function, the backup apparatus comprising:
   a first volume which stores data equivalent to data stored in a volume serving as a copying source in another storage apparatus;
   a copy instruction receiving unit which receives a copy setting instruction issued by a server, from the other storage apparatus with which the server is in communication;
   a local-copy setting unit which makes a setting, based on the copy setting instruction, such that data which is equivalent to the data stored in the first volume is copied to a volume including a free area,
   a recording unit which records a data copy completion area in which a data copy from the first volume is completed;
   a detection unit which detects a data copy completion area in another volume serving as a local copying destination for the first volume based on the data copy completion area recorded in the recording unit and a data copy completion area in the first volume when determining a failure has occurred in the first volume; and
   a session terminating unit which terminates a copying session of the first volume when determining the failure has occurred in the first volume, and
   wherein a session is established between a second volume and said another volume when determining the failure has occurred in the first volume.

8. A backup method including a remote data copy function, the backup method comprising:
   establishing a session between a first volume, serving as a data copying destination in a storage apparatus and a second volume which stores data serving as a copying source of data to be stored in the first volume;

directing a volume including a free area in the storage apparatus such that data equivalent to the data to be stored in the first volume is copied, in response to a copy setting command issued by a server;

recording a data copy completion area in which a data copy from the second volume to the first volume is completed when a failure has occurred in the first volume;

establishing a session between a third volume serving as a local copying destination for the first volume and the second volume;

detecting a data copy completion area in the third volume based on the data copy completion area recorded in a recording unit and a data copy completion area in the first volume; and terminating the session between the second volume and the first volume.

9. The backup method according to claim 8, wherein only an area in which the data copy completion area recorded in the recording unit and the data copy completion area in the first volume coincide with each other is detected, as the data copy completion area in the third volume.

10. The backup method according to claim 8, wherein the data copy completion area in the first volume is controlled by the storage apparatus.

11. The backup method according to claim 8, wherein the volume including the free area is assigned as a fourth volume before the session is terminated, and a session between the third volume and the fourth volume is established.

12. The backup method according to claim 8, wherein, when the plurality of third volumes is set, a session between the third volume in which a copying process is most progressed and the second volume is established.

13. The backup method according to claim 11, wherein a session between the third volume whose session has been established and one of the third volumes except the third volume whose session has been established is established.

14. The backup method according to claim 8, wherein the first volume and the second volume are located in separate storage apparatuses.

15. A computer-implemented method, comprising:

establishing a session between a first volume serving as a copying destination in a storage and a second volume serving as a copying source of data stored in the first volume;

directing a volume in the storage such that data equivalent to the data to be stored in the first volume is copied, in response to a copy setting command issued by a server;

recording a data copy completion area in which a data copy from the second volume to the first volume is completed;

issuing a request for a local copying from a third volume directly communicating with a server and terminating the session between the second volume and the first volume when a failure of the first volume occurs, the third volume serving as a destination of the first volume for the local copying; and implementing the local copying by establishing a session between the third volume and the second volume.

\* \* \* \* \*